US012641394B2

(12) United States Patent
    Isgar

(10) Patent No.: US 12,641,394 B2
(45) Date of Patent: *May 26, 2026

(54) LOCATION INTERACTION TRACKING SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 435 days.

This patent is subject to a terminal disclaimer.

(21) Appl. No.: 17/682,119

(22) Filed: Feb. 28, 2022

(65) Prior Publication Data

US 2022/0286815 A1     Sep. 8, 2022

Related U.S. Application Data

(63) Continuation of application No. 17/201,780, filed on Mar. 15, 2021, now Pat. No. 11,265,683.
(Continued)

(51) Int. Cl.
    *H04W 4/90*        (2018.01)
    *G06F 21/62*       (2013.01)
    (Continued)

(52) U.S. Cl.
    CPC ........ *H04W 4/029* (2018.02); *G06F 21/6254* (2013.01); *H04W 4/023* (2013.01);
    (Continued)

(58) Field of Classification Search
    CPC ....... H04W 4/029; H04W 4/90; H04W 4/023; H04W 4/12; G06F 21/6254; G06F 2221/2111
    See application file for complete search history.

(56) References Cited

U.S. PATENT DOCUMENTS

2012/0150442 A1* 6/2012 Nishikawa ....... G08G 1/096883
                                                            701/519
2014/0167917 A2   6/2014 Wallace et al.
                 (Continued)

OTHER PUBLICATIONS

Isgar, Charles, Location Interaction Tracking System, Patent Cooperation Treaty Application Serial No. PCT/US22/20396, International Filing Date Mar. 15, 2022, International Search Report and Written Opinion dated Jul. 13, 2022.

*Primary Examiner* — Dai Phuong
(74) *Attorney, Agent, or Firm* — Schmeiser, Olsen & Watts LLP

(57)                ABSTRACT

Described is a location interaction tracking system. The system includes a server storing user information including location information and a plurality of user computing devices coupled to the server. The server may be programmed to receive and store location information from a first user computing device of the plurality of user computing devices and aggregate and anonymize the location information as historical paths of travel, wherein the plurality of user computing devices is programmed to send location information at predetermined intervals. A user may use a user computing device to mark himself as a confirmed case for an infectious agent. The system may then label the aggregated, anonymized location information of the user computing device as confirmed and determine what other user computing devices have crossed within a predetermined distance of the confirmed user during a predetermined past time period and notify the users crossing paths with the confirmed user.

8 Claims, 10 Drawing Sheets

Related U.S. Application Data

(60) Provisional application No. 62/992,313, filed on Mar. 20, 2020.

(51) Int. Cl.

| | | |
|---|---|---|
| *H04W 4/02* | (2018.01) | |
| *H04W 4/029* | (2018.01) | |
| *H04W 4/12* | (2009.01) | |

(52) U.S. Cl.
CPC ............... *H04W 4/12* (2013.01); *H04W 4/90* (2018.02); *G06F 2221/2111* (2013.01)

(56) References Cited

U.S. PATENT DOCUMENTS

| | | | |
|---|---|---|---|
| 2016/0071172 A1 | 3/2016 | Shangguan | |
| 2016/0132652 A1* | 5/2016 | Chapman Bates | .... G16H 50/20 |
| | | | 706/11 |
| 2019/0148023 A1 | 5/2019 | Sadilek et al. | |
| 2019/0252078 A1 | 8/2019 | Schubert et al. | |
| 2019/0354491 A1* | 11/2019 | Tada | ................... G06F 16/2255 |
| 2020/0404476 A1 | 12/2020 | Sweet | |
| 2021/0050116 A1 | 2/2021 | Sabeti et al. | |
| 2021/0289319 A1 | 9/2021 | Antony et al. | |
| 2022/0028533 A1* | 1/2022 | Kulkarni | ................ G16H 50/80 |

* cited by examiner

LOCATION INTERACTION TRACKING SYSTEM

CROSS REFERENCE TO RELATED APPLICATION

This application is a continuation of U.S. patent application Ser. No. 17/201,780, filed Mar. 15, 2021, which claims priority to U.S. Provisional Patent Application Ser. No. 62/992,313, filed Mar. 20, 2020, the disclosures of which are hereby incorporated entirely herein by reference.

BACKGROUND OF THE INVENTION

Technical Field

This invention generally relates to a system for gathering data regarding locations of individuals and paths traveled, and more specifically to a location interaction tracking system for tracking a user's path of travel and any backward looking or past interaction/crossing of paths with other users who have been identified by the system as a confirmed case for an infectious agent. The system operates to protect anonymity of all users while providing useful aggregated location data.

State of the Art

Individuals are typically mobile and move about their communities for work purposes, social purposes, entertainment purposes and the like. Often individuals do so without considering their paths of travel and without consideration of whether they cross paths with other individuals except those known by them. There is no conventional way of identifying whether a person crosses paths or comes within a predetermined distance of an individual who has been a confirmed case for an infectious agent. For example, in times of wide spread of infectious agents (viruses, bacteria, fungi, or parasites) there is no known system that allows for individuals to identify past interaction/crossing of paths with others that have been confirmed cases for an infectious agent and further no system that can do so with regard to historical locations.

Accordingly, what is needed is a location interaction tracking system for receiving and aggregating location data and paths traveled by individuals and determining if those paths cross or come within a predetermined distance of other paths of individuals that have been identified as confirmed cases for an infectious agent.

SUMMARY OF THE INVENTION

An embodiment includes a location interaction tracking system for receiving and aggregating anonymized location data and paths traveled by individuals and determining if those paths cross or come within a predetermined distance of other paths of individuals that have been identified as confirmed cases for an infectious agent as established by the medical community. It should be understood that the system is not established for use to hunt down individuals that may have been confirmed, but rather to provide anonymous historical location data of users that have been confirmed cases and how they may have come in contact with other individual users of the system.

An embodiment includes a location interaction tracking system comprising: a server having a memory storing user information comprising location information; and a plurality of user computing devices coupled to the server, wherein the server is programmed to: receive and store the location information from a first user computing device of the plurality of user computing devices and aggregate and anonymize the location information as historical paths of travel, wherein the plurality of user computing devices is programmed to send the location information at predetermined intervals; receive an indication from a second user computing device of the plurality of user computing devices that a user of the second user computing device has been a confirmed case for an infectious agent and label the location information of the second user computing device as confirmed; access and determine which of the plurality of the user computing devices have associated location information that is within a predetermined distance of the second user computing device during a predetermined past time period; generate an alert and send the alert to the first user computing device for display in response to the server labeling the second user computing device as confirmed; and generate and send for display on the first user computing device an interface depicting a day and time of the predetermined past time period that the first user computing device was within the predetermined distance from the second user computing device marked as confirmed in response to receiving a signal to view the interface from the first user computing device.

The plurality of user computing devices may be mobile computing devices. A mobile application may operate on each of the plurality of user computing devices. The user interface may show hot spots, wherein the hot spots are defined by a system administrator. The plurality of user computing devices may be programmed to set boundaries wherein the historical paths do not track to predetermined locations. The system may be used for social distancing. The historical paths of travel may comprise a bus route. The system may track the plurality of user computing devices on public transportation. The time of the predetermined past time period that the first user computing device was within the predetermined distance from the second user computing device marked as confirmed may be rated based on type of exposure. The type of exposure may be categorized as high exposure, medium exposure or low exposure.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a location interaction tracking system for receiving, aggregating and anonymizing location data, including time of day, day of week, location, and the like, associated with users' aggregated, anonymized location data for analysis and reporting. This may be done in efforts to alleviate concerns of public health and safety. The system may include a mobile application operating on a user computing device that may be a mobile computing device like a smartphone, a tablet, a wearable, and the like; and/or the system may operate on any type of computing device as a downloadable application or even as a web application.

Figure 1:
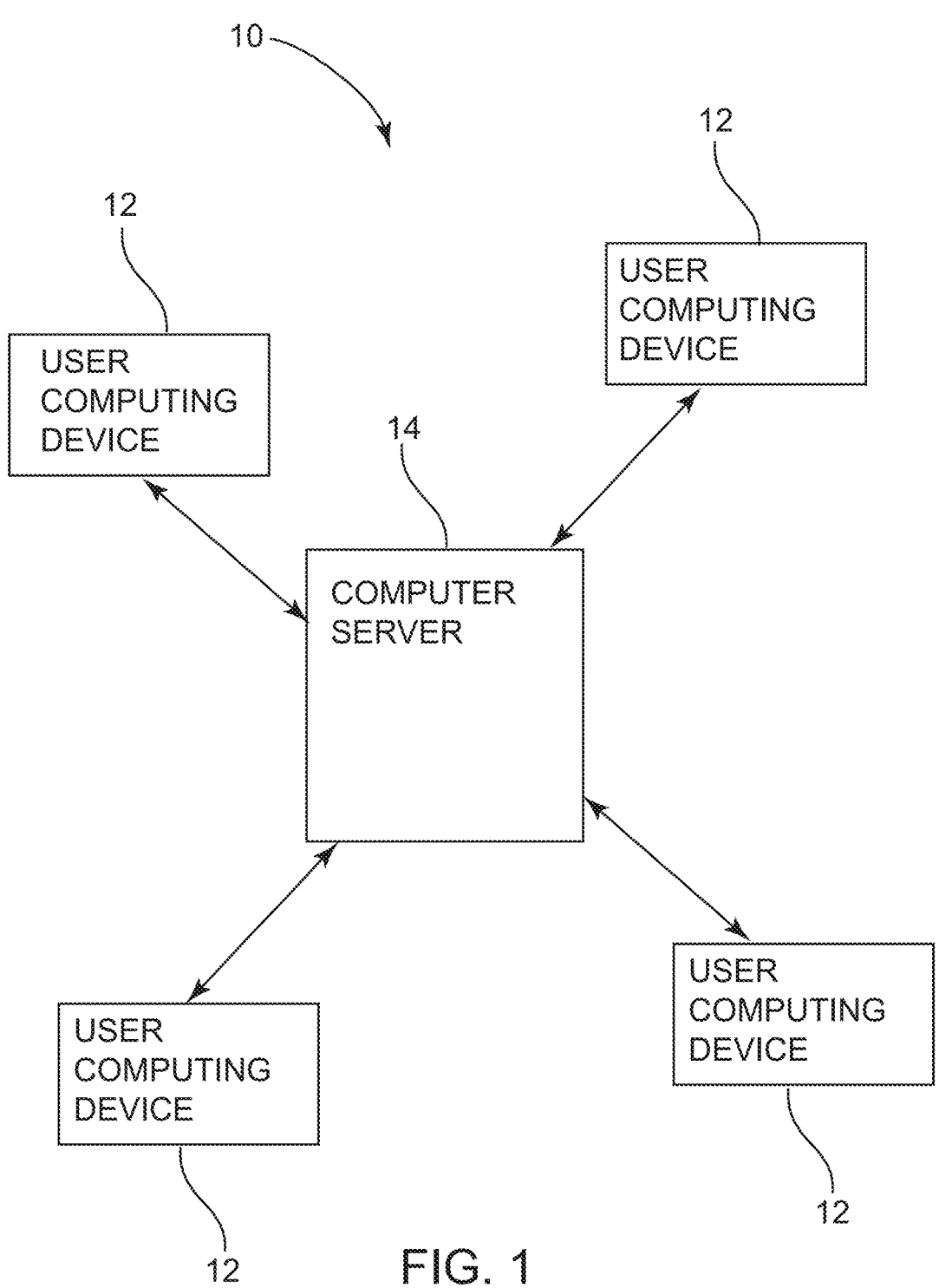
FIG. 1 is a diagrammatic view of a location interaction tracking system according to an embodiment.

FIG. 1 depicts an embodiment of a location interaction tracking system 10. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may be a desktop computer, a laptop, a tablet, a smartphone, a wearable device, and the like. The server 14, in some embodiments, may be a computer server or a cloud-based infrastructure architecture.

The server 14 may include a memory storing various data. The memory of the server 14 may store user information, such as demographic information, and may further store location data, given and received from the user computing device as the user computing device 12 moves throughout a community, town, city, state, country or the like, relating to a user from the user computing device 12 and associated with the user information corresponding to the user computing device 12 sending the location data. The server 14 may operate to aggregate and anonymize the location data in a location database of the memory of the server 14.

A plurality of user computing devices 12 may be coupled to the server 14, and the server 14 may be programmed to receive and store location information from a first user computing device of the plurality of user computing devices 12 and aggregate and anonymize the location information as historical paths of travel, wherein the plurality of user computing devices is programmed to send location information at predetermined intervals; receive an indication from a second user computing device of the plurality of user computing devices that a user of the second user computing device has been a confirmed case for an infectious agent and label the aggregated, anonymized location data of the second user computing device as confirmed; access and determine which of the plurality of user computing devices have associated location information that is within a predetermined distance of the second user computing device during a predetermined past time period; generate an alert and send the alert to the first user computing device for display in response to the server labeling the second user computing device as confirmed; and generate and send for display on the first user computing device an interface depicting a day and time of the predetermined past time period that the first user computing device was within the predetermined distance from the second user computing device marked as confirmed in response to receiving a signal to view the interface from the first user computing device. With regard to some infectious agents, it may be useful to not only report confirmed case users, but report users that are exposed to a population or location with known exposures to one of the infectious agents. In these embodiments, confirmed users may have one color of indication and exposed users have a different color of identification as determined by the system 10. The server 14 may be programmed to perform any of the functions that will be discussed below in greater detail with regard to functionality of the system 10. Further, operation of the system may be adapted based on the type of infectious agent and spreading through the population.

Figure 2:
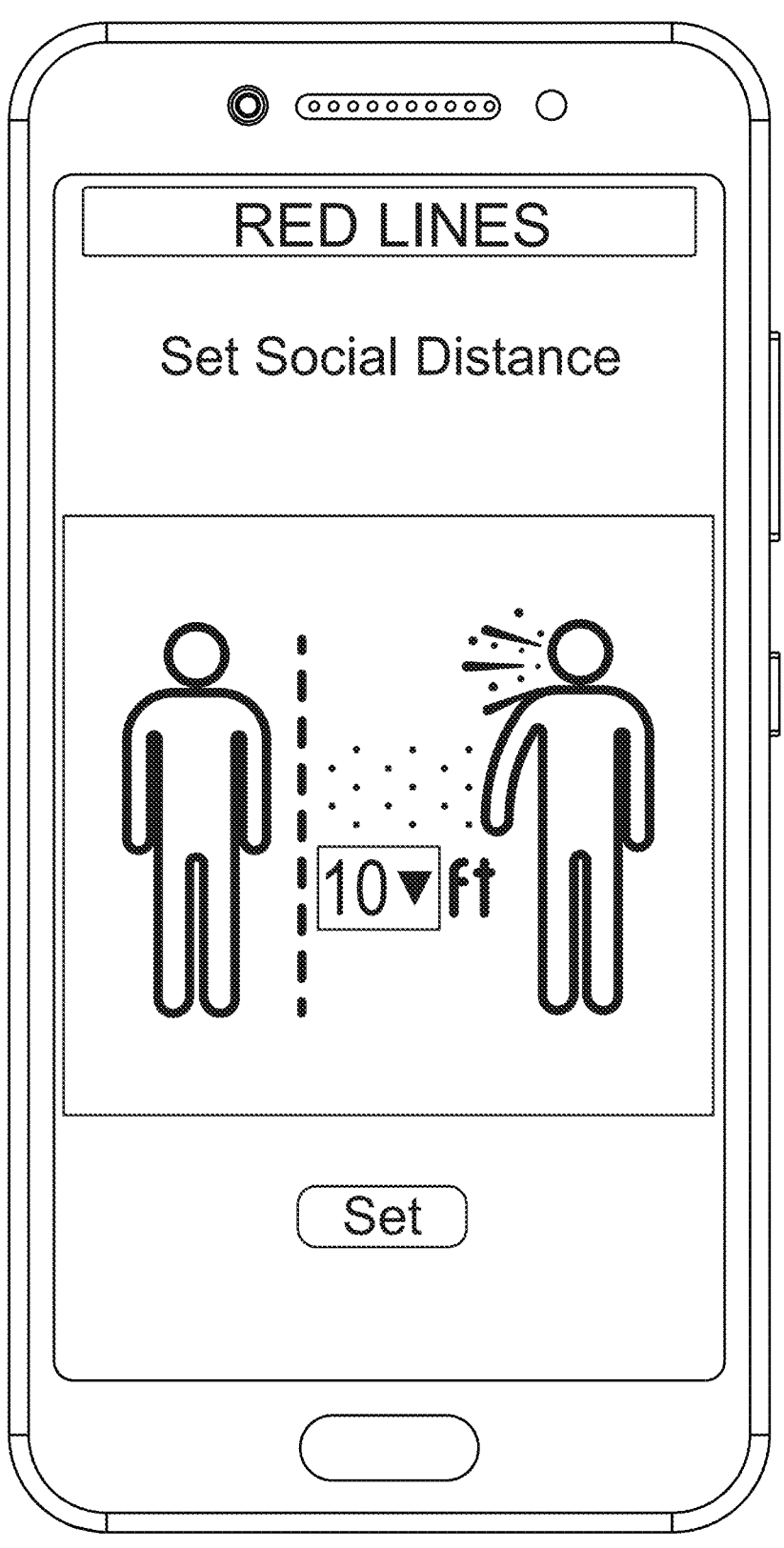
FIG. 2 depicts a user computing device operating an app as part of a location interaction tracking system to enter a predetermined distance set as social distancing from other individuals according to an embodiment.

Referring further to the drawings, FIG. 2 depicts a first user computing device 12 that may be utilized by a user to establish a predetermined distance for social distancing, such as 10 ft, as established by the medical community. This sets the predetermined distance that the server will utilize with regard to the first user computing device 12 to determine if the first user computing device 12 crosses paths or is within the predetermined distance of another user computing device marked as confirmed.

Figure 4:
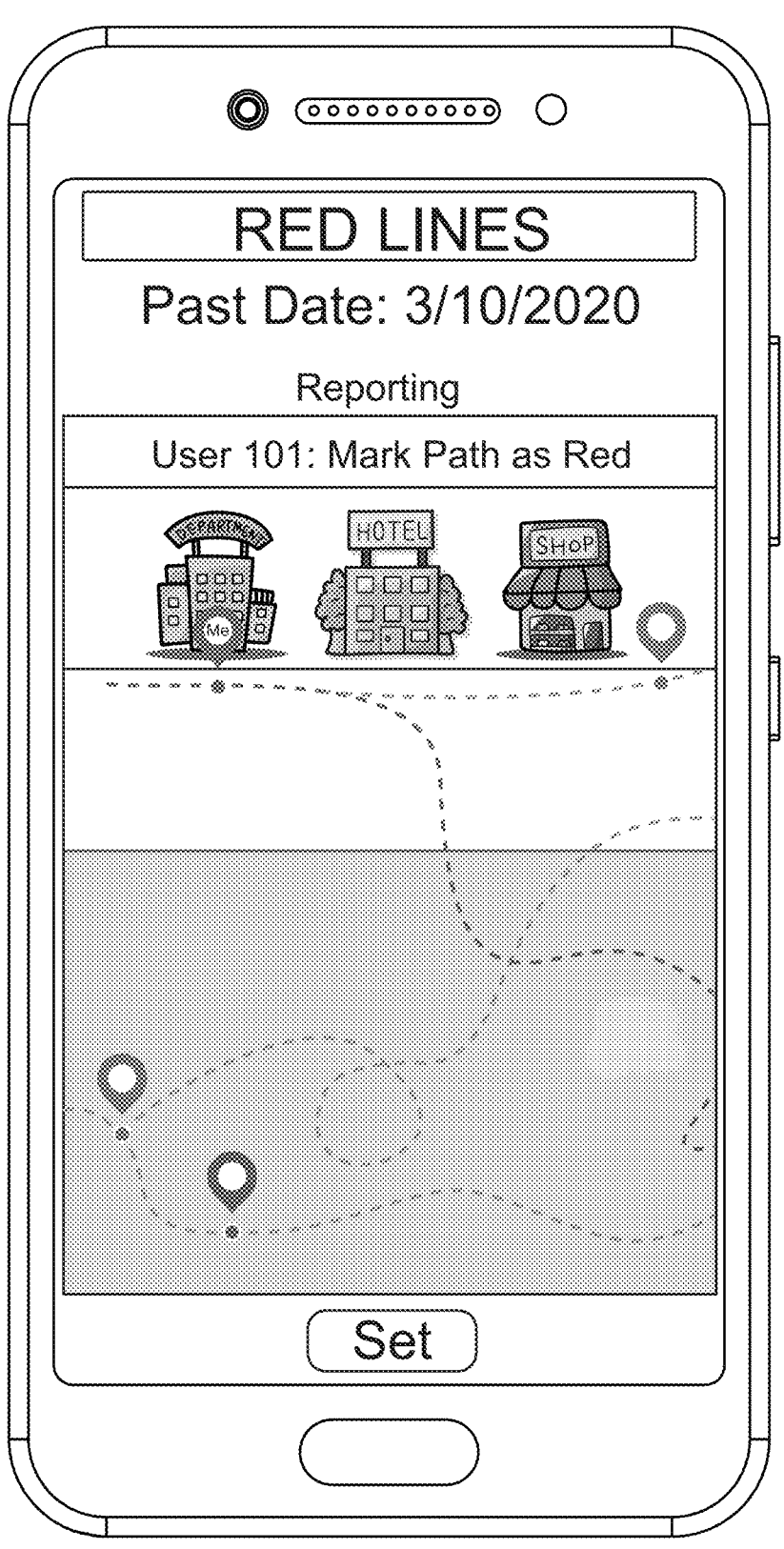
FIG. 4 depicts a user computing device operating an app as part of a location interaction tracking system depicting a first user marking his path as confirmed according to an embodiment.

Referring to FIG. 4, a second user computing device 12 may be used by a user to send an indication from the second user computing device 12 that the user of the second user computing device 12 has been a confirmed case for an infectious agent. The server 14 is programmed to label the aggregated, anonymized location data of the second user computing device 12 as confirmed, such as changing the color of the user's path to red. It will be understood that, in embodiments, the server 14 may be programmed to verify the confirmed indication made by the user. This may be done or may be done with permission from the user to confirm with entities and individuals that can confirm the diagnosis of the user. Once the second user computing device 12 has been labeled as confirmed, the server may then process the aggregated, anonymized information and determine what other user computing devices 12 were within a predetermined distance of the second user computing device 12 during a past time period. It will be understood that there may be a lag in time from the initial report until it is broadcast to the other users and protect the safety of the other user to give them time to reach their safe destination before reporting. This lag may be imposed in order to verify the confirmed indication, to avoid immediate panic by others within a particular location that is the same as the user that identifies he or she is confirmed, to determine if the user is a prankster to avoid abuse of the system 10, or the like.

Additionally, once the server has labeled his or her aggregated, anonymized location data as confirmed (red line), there is a lag in reporting location information of the user to allow the user to get to medical help, a pharmacy, a grocery store for goods, and the like, that are necessary for the user during any time of quarantine. As indicated above, the system 10 is not established for use to hunt down individuals that may have been confirmed, but rather to provide anonymous historical location data of users that have been confirmed cases and how they may have come in contact with other individual users of the system 10.

Figure 5:
FIG. 5 depicts a user computing device operating an app as part of a location interaction tracking system depicting an alert to a second user that she has come within the predetermined distance of the path of the first user marked as confirmed according to an embodiment.

The server 14 may generate an alert and send it to the first user computing device 12 as depicted in FIG. 5. The alert may be displayed on the first user computing device 12 and an audible alert may also be provided. The alert notifies the user of the first user computing device 12 that the first user computing device 12 has crossed paths or come within the predetermined distance from the second user computing device 12. The view button may be selected, and the user computing device would be directed to an interface to show when the first user computing device was within the predetermined distance of the second user computing device that is labeled as confirmed.

Figure 6:
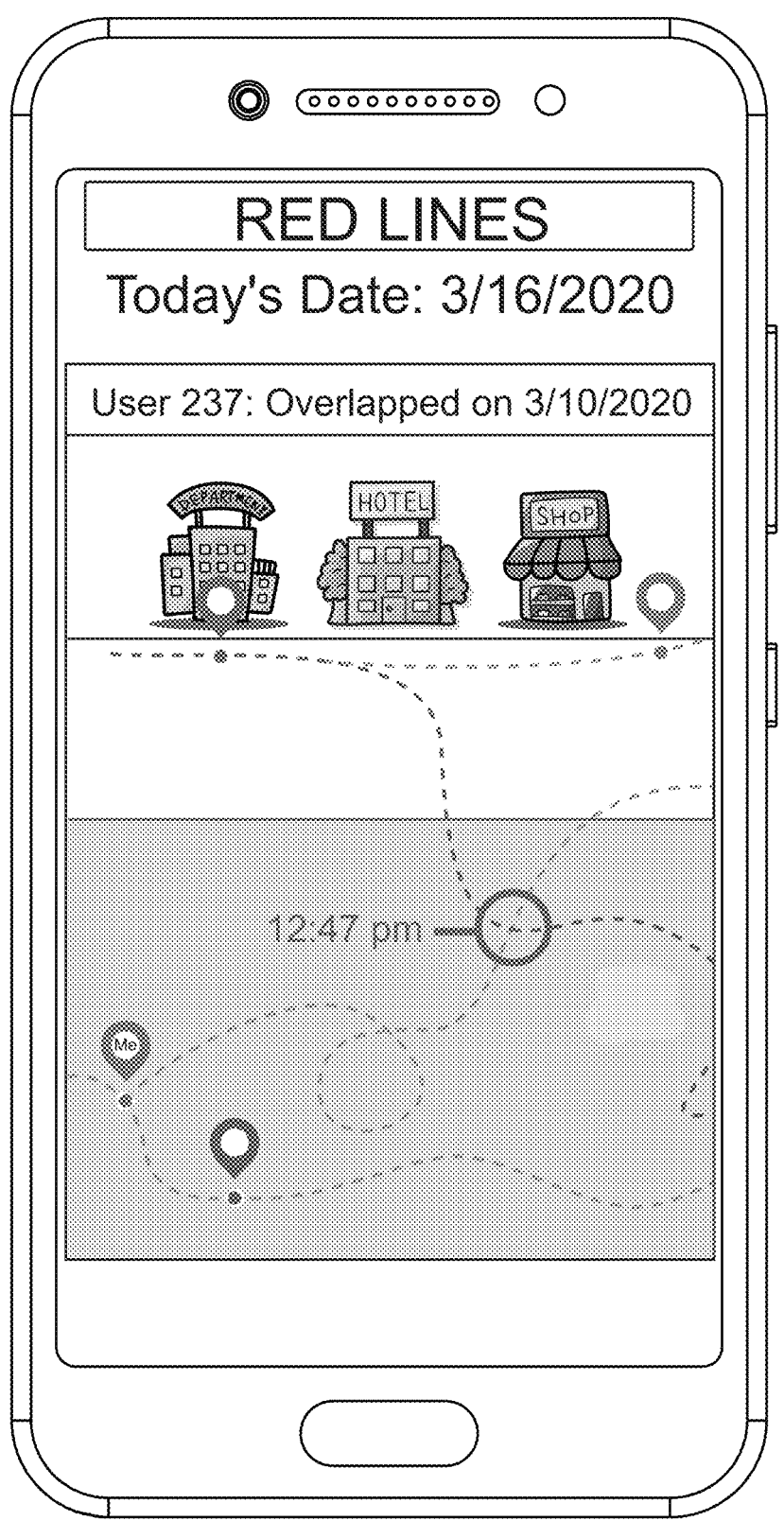
FIG. 6 depicts a user computing device operating an app as part of a location interaction tracking system depicting where the second user's path has crossed the confirmed first user's path on a past date according to an embodiment.

The interface may be depicted on the first user computing device as shown in FIG. 6. It may include a map showing paths of users and, more specifically, to the path of the first user computing device, where it crosses the path of the second user computing device marked as confirmed, and the date and time of such crossing of paths. It will be understood that the system may determine, or it may determine based on input from the user, when the user is in his or her own vehicle, or in a public transportation vehicle, like a train, a bus, a plane or the like. When in the user's own vehicle, the system may not track the user's location until the speed of the user is reduced to a level indicating the user is no longer within the vehicle. The system will then start collecting location information. When the user is in public transportation, the location data will continue to be sent to the server 14.

Figure 7:
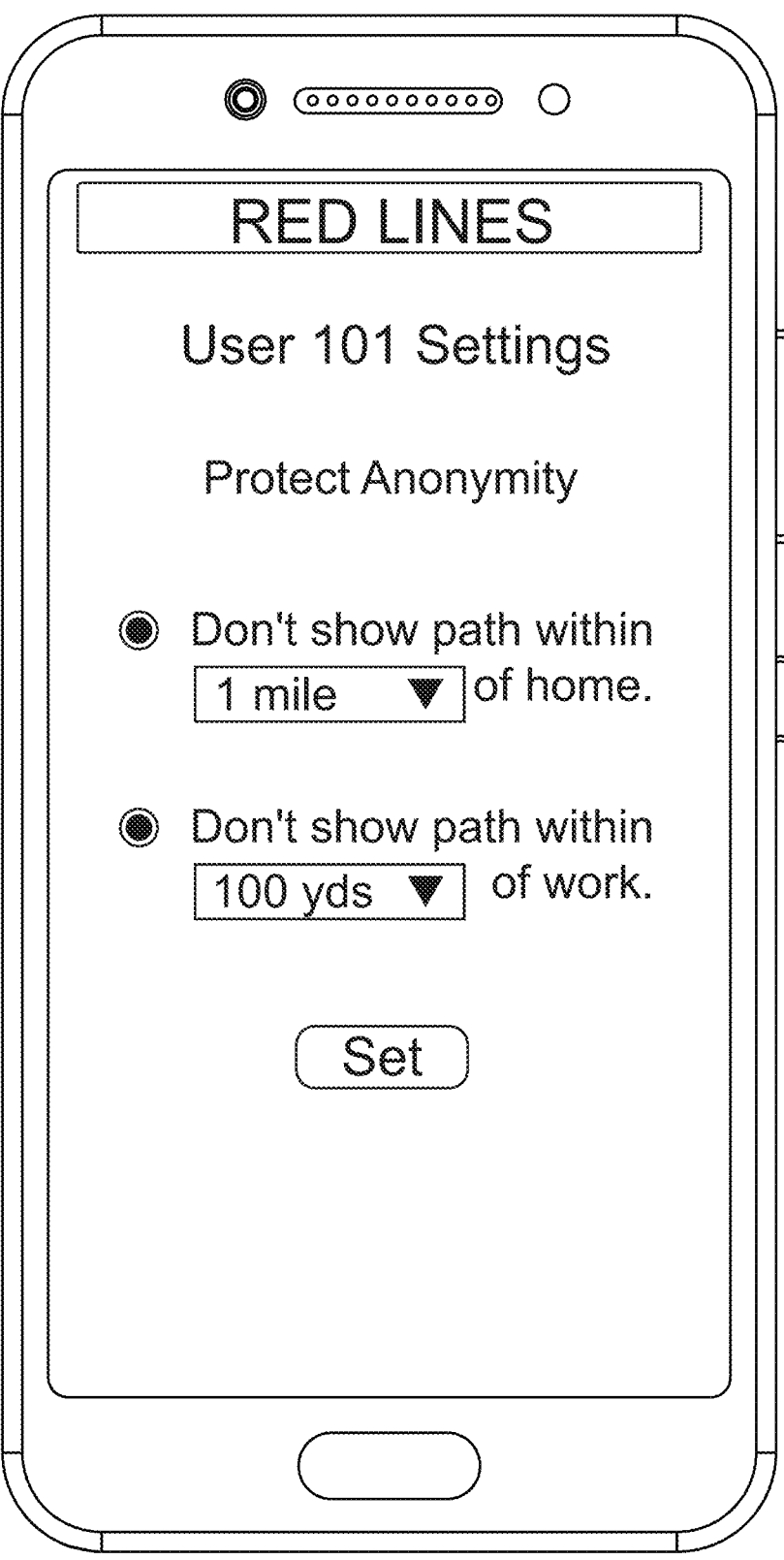
FIG. 7 depicts a user computing device operating an app as part of a location interaction tracking system to enter a user's anonymity settings according to an embodiment.

This system allows users to be good citizens and further allows users to determine if they need to seek medical support or be concerned with such exposure. The system considers safety of the users and, therefore, as shown in FIG. 7, users may set boundaries on places they spend lots of time at, such as at home and at work, wherein the path does not track to these locations, to ensure other users cannot readily determine where the users live or work, providing a safety barrier of the users, and further aiding in the anonymous data being communicated.

Figure 3A:
FIG. 3A depicts a perspective view of shopping mall that is a commonly highly visited location by individuals according to an embodiment.
Figure 3B:
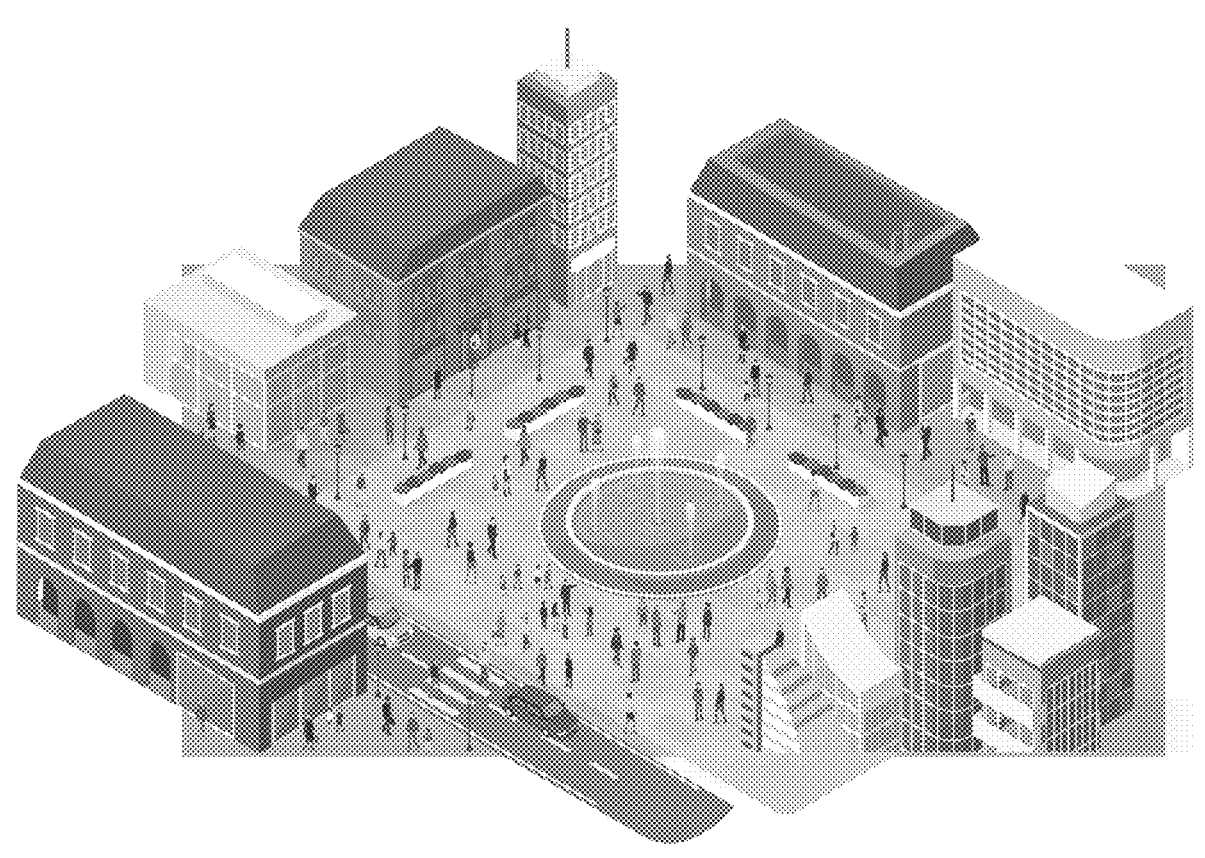
FIG. 3B depicts a perspective view of a downtown plaza that is a commonly highly visited location by individuals according to an embodiment.

It should be appreciated that this is a large ecosystem designed to aid individuals, public health agencies, medical professionals, communities, and venues such as, but not limited to malls, stadiums, arenas, amusement parks, and the like. This can be utilized as just a tool to help identify data that can help with controlling the outbreak of an infectious agent and help identify locations that may be hotbeds. The system has unique efficiencies to select relevant populations and not necessarily the general population and is presented in micro data. These efficiencies are important for health and safety officials. In some embodiments, locations that are frequented by many individuals, such as the mall or downtown plaza depicted in FIGS. 3A-3B, may also be locations that have many paths of individuals that have been confirmed and the past time periods those users were at these locations. It helps to identify measures that may be taken for the venue and by healthcare professionals, and the like, to treat or delay spread of the infectious agent. Accordingly, the system may be configured to send the data to third parties, such as health and safety officials, managers, administrators, government, healthcare related entities and the like. Further, general users may utilize the system prior to visiting areas, such as those depicted in FIGS. 3A-3B, to see if the areas are hot spots or if redlines are found in that area over the last preselected number of days.

Figure 8:
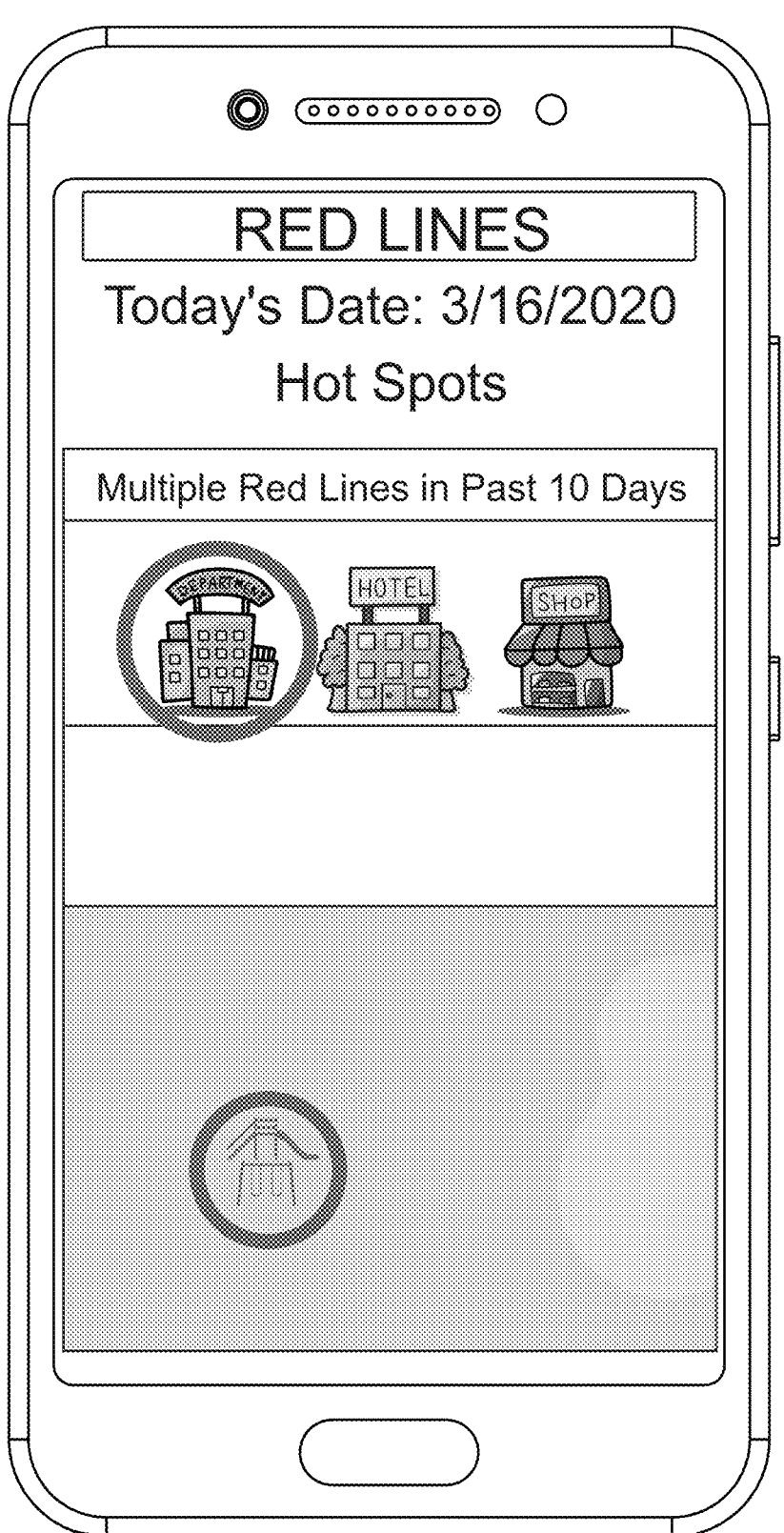
FIG. 8 depicts a user computing device operating an app as part of a location interaction tracking system depicting hot spots according to an embodiment.

Referring further to the drawings, FIG. 8 depicts a user computing device operating an app as part of the system depicting a user interface that shows hot spots. A hot spot may be defined by a system administrator, such as, but not limited to, multiple exposures for a set period of time in a particular geographic area, such as a store or a playground at a park as depicted in the red circles of FIG. 8. Additionally, locations, such as stores, banks, theaters, or the like, may have the ability to report an employee, or other individual working, that may be a confirmed case for an infectious agent, thereby designating the location as a hot spot. Hot spots can be used by managers, administrators or responsible entities to implement certain procedures or may be reported to health officials in order to help determine patterns of spread of the infectious agent.

Figure 9:
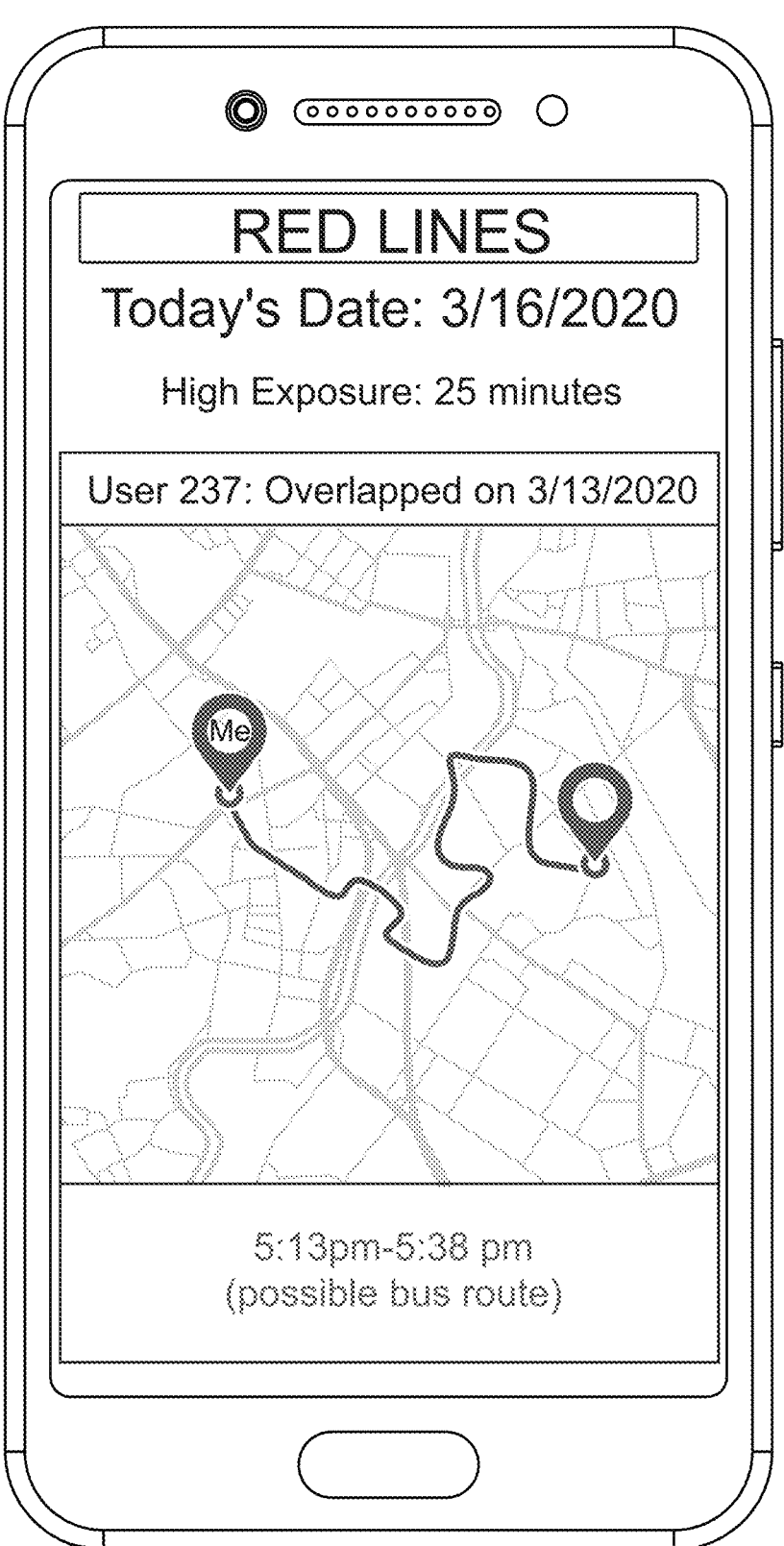
FIG. 9 depicts a user computing device operating an app as part of a location interaction tracking system depicting a high exposure interface according to an embodiment.

FIG. 9 depicts a user computing device operating an app as part of the system depicting a user interface that shows a user path on a bus route. As discussed above, the system may track locations of users on public transportation. This allows the user to determine if she were potentially exposed while on the public transportation, such as that shown in FIG. 9. Because public transportation places individuals in confined spaces, the system may rate the type of exposure to the infectious agent, such as a high exposure and depict the amount of time of possible exposure as the time on the bus. In embodiments, a low exposure may be a first amount of time, a medium exposure may be a second amount of time greater than the first amount of time and a high exposure may be a third amount of time greater than the second amount of time as established by the medical community. By way of example, and not as a limitation, the medical community may establish a low exposure may be less than 5 minutes, a medium exposure may be between 5 and 10 minutes and a high exposure may be over 10 minutes.

While embodiments of the present invention have been depicted with regard to the spread of infectious agents, it will be understood that this system may be utilized for other purposes. For example, it may be used to assist with missing persons, such as a child, a special needs individual, an adult suffering from memory loss, and the like. It can coincide with certain alerts such as Amber Alerts and Silver Alerts.

Embodiments may be available on or through the internet, such as through domain names reserved and owned by Applicant that include anonymous-tracker.com; anonymous-trail.com; anonymous-exposure.com; anonymous-tracker.com; anonymous-healthtrail.com; exposuretrail-.com; my-exposure.com and the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An interaction tracking system comprising:
a server having a memory storing anonymous identifiers; and
a plurality of user computing devices coupled to the server, each of the plurality of user computing devices having a user interface, wherein the server is programmed to:
establish a connection with a first user computing device of the plurality of user computing devices and configured to communicate with the first user computing device;

establish a connection with a second user computing device of the plurality of user computing devices and configured to communicate with the second user computing device;

receive an indication from the second user computing device that a user of the second user computing device is confirmed positive and aggregate anonymous second user identifiers as confirmed positive for a prescribed time period;

automatically generate and send to the first user device information that the first user computing device was within a prescribed range from the second user computing device marked as confirmed positive at least once during the prescribed time period, wherein the first user computing device is configured to alert the user of this contact with the second user computing device; and automatically determine a hot spot based on the aggregated anonymous identifiers from the first user computing device and the second user computing device, wherein the hot spot comprises multiple exposures of the plurality of user computing devices within the predetermined distance of each other during the prescribed time period within a particular geographic area, and, in response to determining the hot spot, send instructions to the first user computing device and the second user computing device to display the hot spot on a map with an indicator identifying the hot spot.

2. The interaction tracking system of claim 1, wherein the plurality of user computing devices are mobile computing devices.

3. The interaction tracking system of claim 2, wherein a mobile application operates on each of the plurality of user computing devices.

4. A method of using an interaction tracking system comprising:

accessing the system by a first user computing device and aggregating anonymous first user identifier gathered from the first user computing device;

accessing the system by a second user computing device and aggregating anonymous second user identifier gathered from the second user computing device;

indicating by the second user computing device that a user of the second user computing device has been labeled as confirmed positive and label the aggregated anonymous second user identifiers as confirmed positive for a prescribed time period;

determining that the first user computing device is within a prescribed distance of the second user computing device during the prescribed time period in response to receiving aggregated anonymous second user identifiers labeled as confirmed;

displaying on the first user computing device an alert that the first user computing device was within the prescribed distance from the second user computing device marked as confirmed positive at least once during the prescribed time period; and automatically determining a hot spot based on the aggregated anonymous identifiers from the first user computing device and the second user computing device, wherein the hot spot comprises multiple exposures of the plurality of user computing devices within the predetermined distance of each other during the prescribed time period within a particular geographic area and, in response to determining the hot spot, sending instructions to the first user computing device and the second user computing device to display the hot spot on a map with an indicator identifying the hot spot.

5. The method of claim 4, wherein the plurality of user computing devices are mobile computing devices.

6. The method of claim 5, wherein a mobile application operates on each of the plurality of user computing devices.

7. A location interaction tracking system comprising:

a server having a memory storing user information comprising location information; and a plurality of user computing devices coupled to the server, wherein the server is programmed to:

receive and store the location information from each user computing device of the plurality of user computing devices and aggregate and anonymize the location information as historical paths of travel, wherein the plurality of user computing devices are programmed to send the location information at predetermined intervals;

automatically access and determine which historical paths of travel of the plurality of user computing devices are within a predetermined distance of other historical paths of travel of other user computing devices during a predetermined past time period; and automatically determine a hot spot based on the aggregated anonymous identifiers from the first user computing device and the second user computing device, wherein a predetermined number plurality of historical paths of travel of the plurality of user computing devices are within a predetermined distance of each other during a day and time of the predetermined past time period in response to receiving a signal from each of the plurality of user computing devices; and in response to determining the hot spot, send instructions to each user computing device of the plurality of user computing devices to display the hot spot on a map with an indicator identifying the hot spot.

8. The system of claim 7, wherein the hot spot is a particular geographic area.

* * * * *